United States Patent [19]
Yamamura et al.

[11] Patent Number: 5,247,239
[45] Date of Patent: Sep. 21, 1993

[54] DUAL DC/DC VOLTAGE CONVERTER POWER SYSTEM

[75] Inventors: Norihisa Yamamura; Kazunori Hibino, both of Tokyo; Kotaro Okada, Narashino, all of Japan

[73] Assignee: Motorola, Inc., Schaumburg, Ill.

[21] Appl. No.: 930,092

[22] Filed: Aug. 12, 1992

[30] Foreign Application Priority Data

Aug. 22, 1991 [JP] Japan .................................. 3-233726

[51] Int. Cl.[5] .............................................. G05F 1/614
[52] U.S. Cl. .................................... 323/272; 323/222; 323/288; 363/65
[58] Field of Search ............... 323/222, 272, 282, 284, 323/288; 363/65

[56] References Cited
U.S. PATENT DOCUMENTS

| | | | |
|---|---|---|---|
| 4,257,090 | 3/1981 | Kroger et al. | 323/222 |
| 4,467,268 | 8/1984 | Chambers et al. | 323/272 |
| 4,766,364 | 8/1988 | Biamonte et al. | 363/65 |
| 4,779,184 | 10/1988 | White | 363/65 |
| 4,816,739 | 3/1989 | Sakurai et al. | 323/272 |
| 4,825,144 | 4/1989 | Alberkrack et al. | 323/272 |

*Primary Examiner*—J. L. Sterrett
*Attorney, Agent, or Firm*—Robert D. Atkins

[57] ABSTRACT

A voltage converter for stably converting, even a low input voltage, to a predetermined output level is provided. The output of cell 20 is increased by first and second step-up circuits 21 and 22, and then smoothed by smoothing circuit 31. The output is converted by the first step-up circuit from the start of voltage conversion until a predetermined output voltage, and then converted by the second step-up converter thereafter. The output voltage of smoothing circuit 31 is compared against a first reference voltage by first comparator circuit 35, the output of which activates the integral circuit in second comparator circuit 37. The charge voltage of the integral circuit is compared to a sawtooth wave STW generated by oscillator circuit 43 to derive a signal for forcefully shutting down MOS transistor 29 in the second step-up circuit. On the other hand, a error voltage between the output of smoothing circuit 31 and a second reference voltage is amplified, followed by comparison with the sawtooth wave, and the resulting output is combined with the output of the second comparator circuit to control the pulse width of MOS transistor 29 for a desired output voltage.

4 Claims, 3 Drawing Sheets

DUAL DC/DC VOLTAGE CONVERTER POWER SYSTEM

FIELD OF THE INVENTION

The present invention relates, in general, to voltage converter circuits for use in power supply circuitry, and more specifically to a voltage converter for converting a relatively low input voltage to a predetermined voltage level.

BACKGROUND OF THE PRIOR ART

There are many electronic devices and apparatus, especially in consumer electronics, that use a battery (cell) as their power supply. The voltage that can be provided by the cell does not necessarily match the voltage used in electronic devices. Thus, a need exists to convert the voltage, i.e., increase the voltage for supply to electronic circuitry. Step-up circuits, also called upconverters, have traditionally been used wherein two step-up circuits are connected in parallel in order to accommodate particularly low input voltages. FIG. 3 illustrates a step-up circuit comprising two parallel stages.

In FIG. 5, coil 1 and transistor 2 are connected in series between power supply line 3 and ground 4, while an anode of diode 5 is connected to a node formed by coil 1 and transistor 2. The output of oscillator circuit 6 is connected to a gate of transistor 2, turning transistor 2 on and off. Step-up circuits 7 and 8 configured in this way are connected in two parallel stages, with cathodes of diodes 5 and 9 being coupled together, from which increased output voltage is extracted. The extracted output is supplied to smoothing circuit 10, where a smoothed DC current is taken from output 11. The output of smoothing circuit 10 is provided to level sense circuit 13 and pulse width control circuit 14, respectively.

A pulse provided from oscillator circuit 6 switches transistor 2 from on to off, a voltage higher than that on power supply line 3 is developed at node of coil 1 and diode 5, and decreases gradually. Then, upon turn-on of transistor 2, the voltage becomes approximately equal to ground voltage. Therefore, at the anode of diode 5 is developed a voltage fluctuation corresponding to the pulse provided by oscillator circuit 6, and when the fluctuation is rectified by diode 5, a voltage higher than that on power supply line 3 is obtained. When the smoothed voltage provided by diode 5 becomes higher than a predetermined voltage level, transistor 2 is turned off, so that a control pulse continues to be supplied from oscillator circuit 6 to transistor 12 via pulse width control circuit 14.

The second-stage step-up circuit 8 performs a similar operation to that of step-up circuit 7, to provide an increased voltage from diode 9. Level sense circuit 13, also called a shut-down circuit, provides a low-level voltage to gate 15 and stops a supply of pulses from oscillator circuit 6 to transistor 2 when the output voltage from output 11 reaches a predetermined level. Upon termination of supply of pulses, a control pulse from pulse width control circuit 14 is supplied to the gate of transistor 12, and step-up circuit 8 starts its operation. Pulse width control circuit 14 controls, in response to an input voltage, i.e., the output voltage of output 11, the pulse width of the control pulse. That is, when the output voltage becomes lower than a target voltage level, it controls the pulse width so that the turn-on period for transistor 12 is extended, whereas when the voltage becomes higher than the target level, it controls the pulse width so that the turn-off period for transistor 12 is extended. Even if the load fluctuates in that way, the output voltage is controlled so that it is maintained constant.

As described above, connecting step-up circuits in two parallel stages and switching them from the first stage to the second permits a relatively low voltage to be converted to a target voltage level. However, since a rush current to the step-up circuits is developed upon switching to the second-stage step-up circuit, a large current will temporarily tend to draw momentarily from the cell. As a result, the output voltage of the cell is decreased due to an internal resistance of the cell, thus reducing the output voltage of the voltage converter. When the output voltage of the cell is too low, it is impossible to smoothly switch to the second-stage step-up circuit, resulting in, for example, unstable oscillation of the oscillator circuit, and, in the worst-case scenario, failure of the voltage converter to operate.

SUMMARY OF THE INVENTION

The aforementioned problem is overcome by the present invention. Accordingly, it is an object of the present invention to provide a voltage converter that prevents overload imposed on the cell upon switching to the second-stage step-up circuit, thus facilitating smooth switching thereto.

The present invention comprises a cell; an oscillator means for generating a repetitive signal of a predetermined frequency; a sawtooth-wave generator circuit responsive to the repetitive signal from said oscillator means to derive a sawtooth wave; a first step-up means coupled to the output of said cell and to said oscillator means to activate and deactivate the switching means coupled to said oscillator means, thereby increasing the output voltage of said cell; a second step-up means coupled to the output of said cell and to a pulse width control signal to activate and deactivate the switching means in accordance with said pulse width control signal, thereby increasing the output voltage of said cell; a smoothing means for smoothing an output voltage, said output voltage being a combination of the output of said first step-up means and the output of said second step-up means; a first comparator means for providing a stop pulse that stops the operation of said first step-up means when the output voltage of said smoothing means reaches a predetermined first reference voltage; a second comparator means responsive to said stop pulse to start charging and compare the magnitudes between the voltage of said sawtooth wave and said charge voltage, providing a forced shut-down pulse for shutting down said switching means in said second step-up means; and a pulse width control means for comparing the magnitudes between a voltage proportional to a voltage differential and said sawtooth-wave voltage, said voltage differential between a voltage proportional to the output voltage of said smoothing means and a predetermined second reference voltage, said pulse width control means also providing said pulse width control signal, at least for a period during which said forced shut-down pulse exists, said pulse width control signal containing said forced shut-down pulse.

According to the present invention, a power supplied from the cell is voltage converted by the first and second step-up means. The output voltage of the cell is provided to the first step-up means. A predetermined repetitive signal fed from the oscillator means is also provided to the first step-up means. The repetitive signal activates and deactivates the switching means in the first step-up means, thereby increasing the voltage provided from the cell. Similarly to the first step-up means, the second step-up means increases the output voltage of the cell, however, the switching means in the second step-up means is repetitively activated and deactivated by the pulse width control signal provided from the pulse width control means. This activation and deactivation causes the output voltage of the cell to be increased. The increased output voltage is controlled by the pulse width control signal so that it is maintained at a predetermined voltage level.

The increased voltage is provided to the smoothing means where it is smoothed. When the smoothed voltage reaches the first reference voltage, the first comparator means provides a stop pulse for stopping the operation of the first step-up means. The provision of this stop pulse causes the first step-up means to stop operation, and then the second step-up means starts operation. Upon receipt of the stop pulse, the second comparator means starts charging. The charge voltage is compared in magnitude to a sawtooth wave derived in accordance with the repetitive signal provided from the oscillator means. A forced shut-down pulse provided as a result of this comparison forces the switching means in the second step-up means to be shut down.

The output voltage of the smoothing means is also provided to the pulse width control means to determine a voltage that is proportional to a difference between a voltage proportional to the output voltage thereof and the second reference voltage. The voltage proportional to the voltage differential is compared in magnitude to the sawtooth wave to provide a pulse width control signal containing the forced shut-down pulse therein.

The pulse width control signal is supplied to the switching means in the second step-up means to repetitively activate and deactivate the switching means, thereby increasing the output voltage of the cell for output thereof.

DESCRIPTION OF A PREFERRED EMBODIMENT

Figure 1:
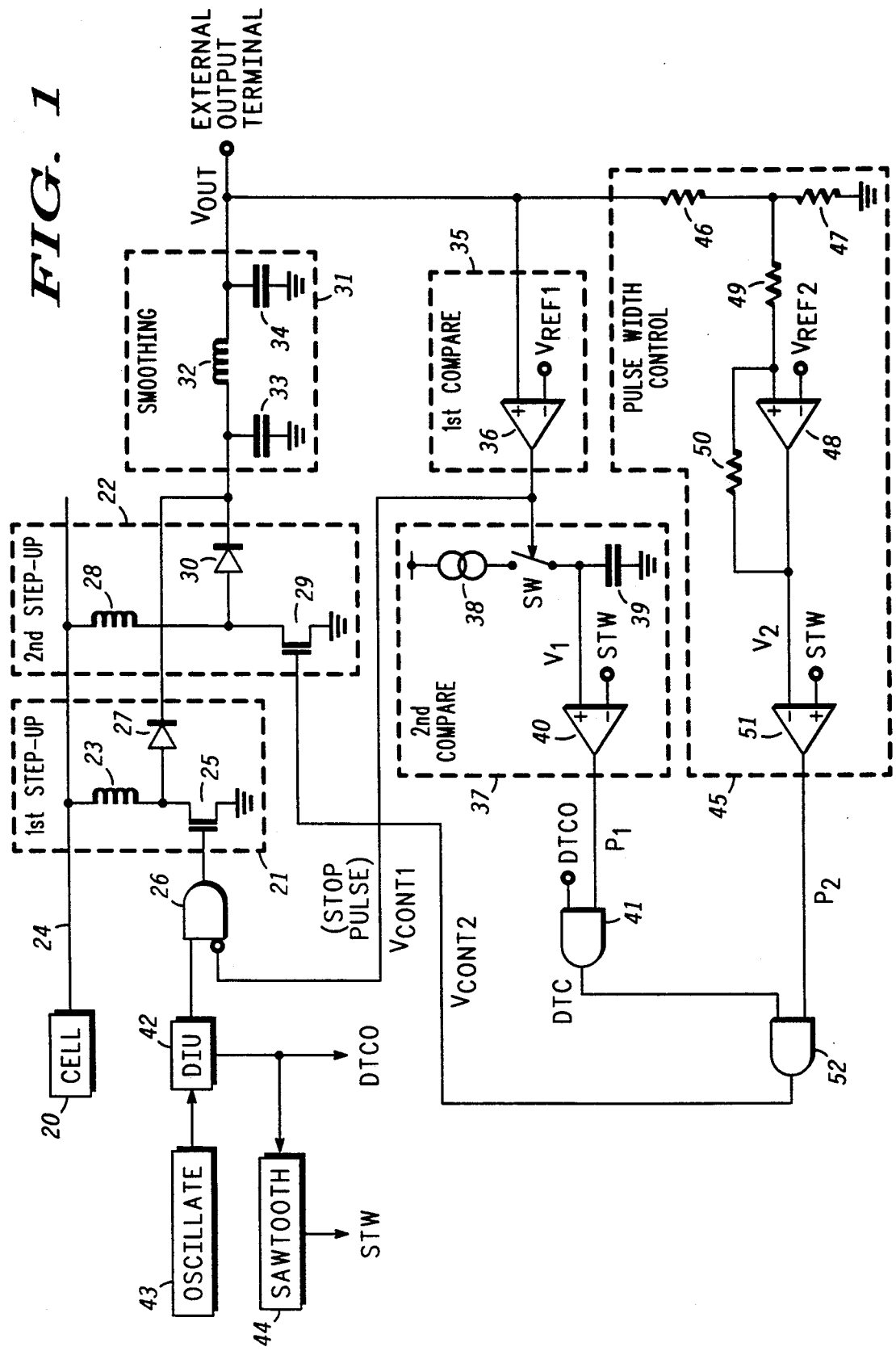
FIG. 1 is a circuit diagram of a voltage converter for illustrating one embodiment of the present invention.

FIG. 1 shows a circuit diagram of a voltage converter according to one embodiment of the present invention. A battery cell 20, comprised of a manganese cell, alkali cell, mercury cell, and the like, is normally used as a power supply for an electronic circuit within an electronic apparatus as it is incorporated therein, or used as a power source for use with a motor. The output of cell 20 is applied to first and second step-up circuits 21 and 22. First step-up circuit 21 comprises a coil, one terminal thereof being connected to a power supply line 24 and the other connected to a drain of a MOS transistor 25. A source of MOS transistor 25 is connected to ground, and its gate is connected to an output of a logic circuit 26. In order to ensure operation even if the output voltage of cell 20 is low, MOS transistor 25 is selected such that it has a low gate threshold voltage Vth. An anode of diode 27 is connected to a node between coil 23 and the drain of transistor 25. Second step-up circuit 22 has the same configuration as the first step-up circuit. A series circuit comprising a coil 28 connected between power supply line 24 and ground, and MOS transistor 29 is provided, with an anode of diode 30 being connected to a node between coil 28 and a drain of MOS transistor 29. MOS transistor 29 may be a power MOS transistor, such as LD•MOS transistor available from Motorola Inc., in order to obtain a low on-resistance by applying high gate voltage. The cathodes of diodes 27 and 30 are coupled together and are connected to smoothing circuit 31.

The cathodes of diodes 27 and 30 are connected to a smoothing coil 32 of smoothing filter 31 and to one terminal of capacitor 33, the other terminal of which is connected to a capacitor 34 and to an output of the voltage converter, Vout. Capacitors 33 and 34, together with coil 32, perform smoothing action. In particular, when cell 20 is of a manganese type, a considerable rush circuit is drawn when switching to second step-up circuit 22, introducing a possibility that the output voltage thereof may drop substantially. To avoid such a voltage drop, the duty ratio of the control signal applied to second step-up circuit 22 is reduced upon switching to the second step-up circuit 22 to limit the output current from cell 20, thereby preventing overload, and capacitor 34 with a relatively large capacitance is provided to prevent a drop in the output voltage from smoothing circuit 31.

The output of smoothing circuit 31 is connected to a non-inverting input of a hysteresis comparator 36 in first comparator circuit 35, and to its inverting input is provided a first reference voltage Vref1. The output of comparator 36 is applied to a switch SW in second comparator circuit 37. One terminal of switch SW is connected to the power supply via current source 38. The other terminal of switch SW is connected to capacitor 39, the other terminal of which is connected to ground. Current source 38 and capacitor 39 form an integral circuit, which starts charging to capacitor 39 upon turn-on of switch SW. A node between switch SW and capacitor 39 is connected to a non-inverting input of comparator 40. To its inverting input is provided a sawtooth wave STW. The output of comparator 40 is applied to one input of an AND circuit 41, the other input of which receives a short pulse DTC0 with a low-level period from a frequency divider circuit 42.

The pulse provided from oscillator circuit 43 is divided by frequency divider circuit 42 to output a repetitive pulse of approximately 128 kHz. A portion of the divided pulse is provided to sawtooth-wave circuit 44 to derive a sawtooth wave STW.

Power to first step-up circuit 21, AND circuit 26, frequency divider circuit 42 and oscillator circuit 43 is supplied from cell 20, although power supply lines thereto are omitted in FIG. 1.

The output of smoothing circuit 31 is also connected to a voltage divider circuit comprised of resistors 46 and 47 of pulse width control circuit 45. An input resistor 49 is connected between the node of resistors 46 and 47 and the non-inverting input of operational amplifier 48, and a resistor 50 is provided between the non-inverting input and the output. A second reference voltage Vref2 is provided to the inverting input, and operational amplifier 48 amplifies, by an amplification factor determined by a resistance ratio of resistors 49 and 50, a voltage differential between the voltage divided by voltage divider and the second reference voltage. The output of operational amplifier 48 is connected to the non-inverting input of comparator 51. Sawtooth wave STW is applied to the inverting input of comparator 51, and is compared to the output voltage of operational amplifier 48. The outputs of comparator 51 and AND circuit 41 are connected to the input of AND circuit 52. The output of AND circuit 52 is connected to the gate of MOS transistor 29 in second step-up circuit 22.

Power to second step-up circuit 22, smoothing circuit 31, first and second comparator circuits 35 and 37, AND circuits 41 and 52, sawtooth-wave circuit 44 and pulse width control circuit 45 is omitted in FIG. 1, but the output of smoothing circuit 31 is supplied thereto.

Figure 2:
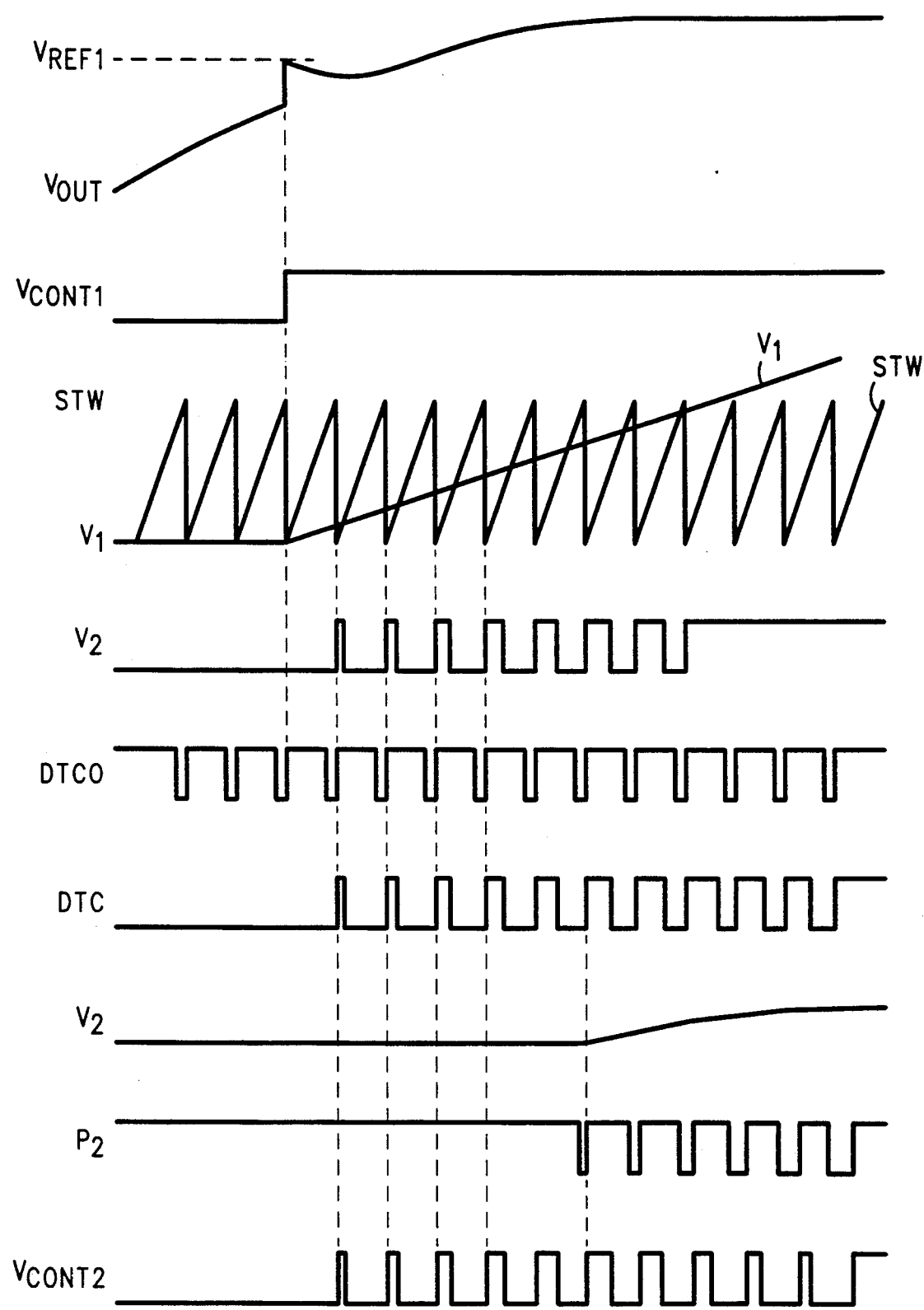
FIG. 2 shows signal waveform diagrams for various parts of the voltage converter shown in FIG. 1 for illustrating the operation thereof.

Now, referring to the timing chart in FIG. 2, the operation of the voltage converter of FIG. 1 is described. When the power switch of an electronic device is turned on, the output voltage of cell 20 is supplied to first step-up circuit 21. Power is also supplied to second step-up circuit 22 via power supply line 24; however, since a low-level voltage is provided to the gate of MOS transistor 29, its operation is disabled. A control pulse derived from oscillator circuit 43 is applied to the gate of MOS transistor 25 in first step-up circuit 21 via AND circuit 26 (to the other input of AND circuit 26 is provided a low-level signal). MOS transistor 25 is turned on and off repetitively in response to the control pulse applied thereto. When the MOS transistor 25 is turned on, a current flows from cell 20 via coil 23 and MOS transistor 25, so that a low-level voltage (a drain-to-source voltage) is provided to the anode of diode 27. Then, when the MOS transistor 25 is turned off, the current flowing through coil 23 tends to flow from MOS transistor 25 to diode 27; however, since the input resistance to the diode is higher than the on-resistance of MOS transistor 25, an induced voltage is developed across coil 23. This induced voltage is supplied to smoothing circuit 31 via diode 27, and provided at an external output terminal OUTPUT after smoothing, as well as being applied to the non-inverting input of comparator 36 in first comparator circuit 35.

Figure 3:
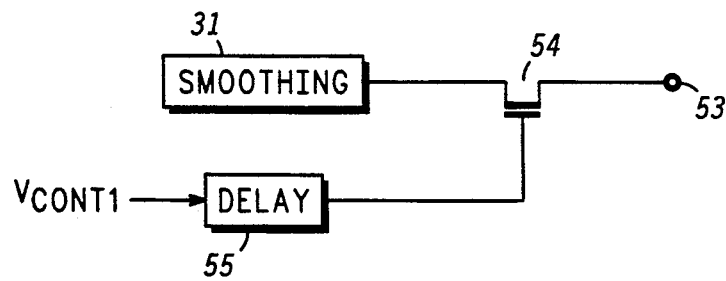
FIG. 3 is a circuit diagram for explaining another embodiment of the present invention.

Comparator 36 compares output voltage Vout of the smoothing circuit against first reference voltage Vref1, and outputs a stop pulse Vcont1 of high level as shown in FIG. 3 when the output voltage Vout reaches the first reference voltage Vref1. When the stop pulse Vcont1 goes high, the application of the control pulse from frequency divider 42 to the gate of MOS transistor 25 stops. This turns off MOS transistor 25, thus terminating the operation of the first step-up circuit.

The high-level stop pulse Vcont1 from comparator 36 activates the operation of the integral circuit in the second comparator circuit. That is, switch SW becomes conductive upon application of the high-level stop pulse, thus drawing a charge current from current source 38 into capacitor 39. This charging causes the voltage across capacitor 39 to rise. The charge voltage V1 for capacitor 39 is applied to the non-inverting input of comparator 40, and compared to the sawtooth wave STW applied to its inverting input. As shown in the timing chart of FIG. 2, for a period during which the charge voltage V1 is higher than sawtooth wave STW's voltage, a high-level output voltage P1 is output and applied to AND circuit 41. The output voltage P1 is ANDed with a low-level short pulse DTC0 provided from frequency divider circuit 42, as shown in FIG. 2. That is, a low-level period of pulse DTC0 is added to the output pulse of comparator 40. This pulse DTC0 is added in order to prevent MOS transistor 29 from being turned on continuously.

The output voltage of smoothing circuit 31 is divided by resistors 46 and 47, and an error voltage with respect to the second reference voltage Vref2 is amplified by an amplification factor determined by a ratio of resistors 49 and 50. The error voltage Vp so amplified is compared to the voltage of the sawtooth wave STW by comparator 51 to provide a pulse P2. This pulse P2 is provided to AND circuit 52 and ANDed with pulse DTC. The output of AND circuit 52 is applied as a pulse width control signal Vcont2 to the gate of MOS transistor 29 to control the step-up operation of second step-up circuit 22. This permits a constant output voltage to be obtained.

FIG. 3 shows an additional circuit to FIG. 1 to explain the voltage converter for externally supplying a stable output voltage. Referring to FIG. 3, a MOS transistor 54 is provided between smoothing circuit 31 and an external output terminal 53. Also, the output of first comparator circuit 35, or stop pulse Vcont1, is applied to a delay circuit 55. Delay circuit 55 is a circuit that delays an input pulse by a predetermined time for delayed output. When the output voltage of smoothing circuit 31 reaches the first reference voltage, the stop pulse Vcont1 is output, and delay circuit 55 then delays the stop pulse Vcont1 by, for example, 500 msec, for delayed output. Therefore, MOS transistor 54 becomes conductive after a delay of 500 msec following the output voltage of smoothing circuit reaching the first reference voltage, and outputs a converted voltage via external output terminal 53.

In this way, by delaying the output voltage of smoothing circuit 31 by a predetermined time before output, stable activation is ensured. Further, since no external current flows until the converted voltage becomes stable, the time required for the voltage to become stable is reduced. In addition, while the operation of the voltage converter is stopped, a drain of current from cell 20 to an external load is prevented.

Figure 4:
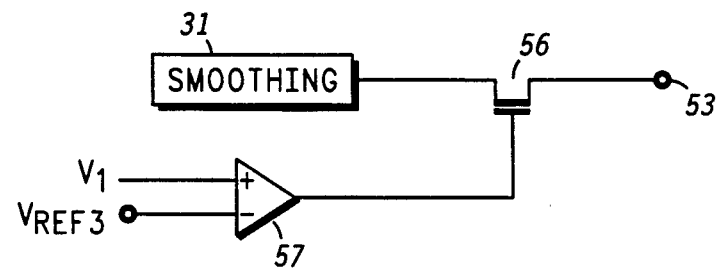
FIG. 4 is a circuit diagram for explaining still another embodiment of the present invention.
Figure 5:
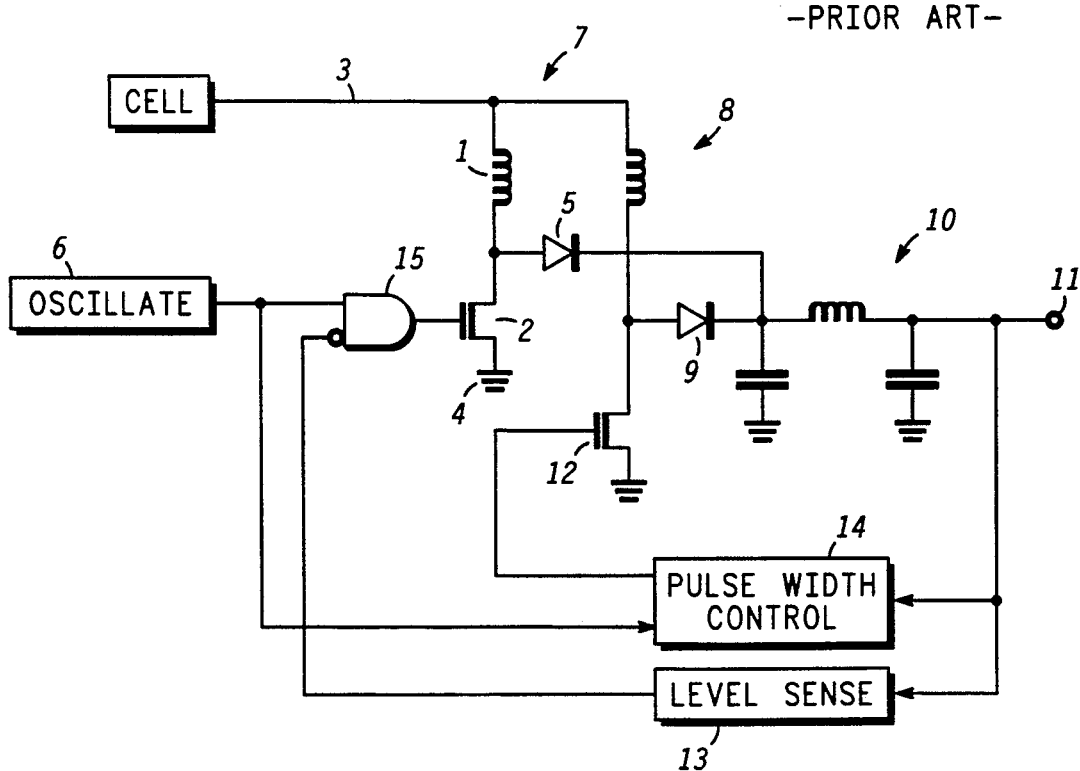
FIG. 5 is a circuit diagram of prior art.

FIG. 4 shows another embodiment of the present invention for achieving stable converted voltage. The configuration of smoothing circuit 31 and MOS transistor 56 is the same as the aforedescribed embodiment. The charge voltage of the charge circuit in second comparator circuit 37 is provided to the non-inverting input of comparator 57, while to its inverting input is applied a third reference voltage. When the output voltage of smoothing circuit 31 has reached the first reference voltage and starts charting the charge circuit, the charge voltage V1 starts rising. When the charge voltage V1 has reached the third reference voltage, comparator 57 provides a high-level output to the gate of MOS transistor 56. As a result, MOS transistor 56 becomes conductive, and smoothing circuit 31 provides a converted output voltage via external output terminal 53.

Thus, according to the present embodiment, the converted voltage can be output after the output voltage of smoothing circuit 31 becomes stable. Further, since no output is provided until the converted voltage becomes stable, no external current draws. Thus, the time required for the output voltage to become stable can be reduced.

Now, it would be appreciated that according to the present invention, upon switching to the second step-up means, the time required to turn on the switching means in the second step-up means can be reduced, thereby minimizing the value of current flowing into the second step-up means, so that a momentary drop in the output voltage of the cell can be prevented.

Furthermore, since a momentary drop in the output voltage is prevented, the time required to activate the voltage converter, i.e., to reach a target voltage, can be reduced, thus eliminating the possibility of startup failure of the voltage converter.

In addition, according to the present invention, since the output is disabled until the output voltage becomes stable, it is possible to provide an improved voltage converter with good startup performance, independent of external load characteristics, and the time required for the output voltage to stabilize can also be reduced.

We claim:

1. A voltage converter comprising:
   a cell;
   an oscillator means for generating a repetitive signal of a predetermined frequency;
   a sawtooth-wave generator responsive to the repetitive signal from said oscillator means to derive a sawtooth wave;
   a first step-up means coupled to the output of said cell and to said oscillator means to activate and deactivate a switching means coupled to said oscillator means, thereby increasing the output voltage of said cell;
   a second step-up means coupled to the output of said cell and to a pulse width control signal to activate and deactivate a switching means in accordance with said pulse width control signal, thereby increasing the output voltage of said cell;
   a smoothing means for smoothing an output voltage, said output voltage being a combination of the output of said first step-up means and the output of said second step-up means;
   a first comparator means for providing a stop pulse for stopping the operation of said first step-up means when the output voltage of said smoothing means has reached a predetermined first reference voltage;
   a second comparator means responsive to said stop pulse to start charging, said comparator means comparing the magnitudes between the voltage of said sawtooth wave and said charge voltage to provide a forced shut-down pulse for shutting down said switching means in said second step-up means; and
   a pulse width control means for comparing the magnitudes between a voltage proportional to a voltage differential and the voltage of said sawtooth wave, said voltage differential between a voltage proportional to the output voltage of said smoothing means and a predetermined second reference voltage,
   said pulse width control means providing said pulse width control signal containing said forced shut-down pulse at least for a period during which said forced shut-down pulse exists.

2. The voltage converter according to claim 1 wherein:
   said first step-up means comprises a MOS transistor having a source connected to ground, a drain, and a gate, and a coil having one terminal coupled to the output of said cell and the other terminal coupled to an anode of a diode and to the drain of said MOS transistor; and
   said second step-up means comprises a power MOS transistor having a source connected to ground, a drain, and a gate, and a coil having one terminal coupled to the output of said cell and the other terminal coupled to an anode of a diode and to the drain of said power MOS transistor.

3. The voltage converter according to claim 1 further comprising:
   an output switching means provided between the output of said smoothing circuit and an external output terminal; and
   a delay means for delaying said stop pulse by a predetermined time;
   wherein said output switching means is activated in response to the output of said delay means.

4. The voltage converter according to claim 1 further comprising:
   an output switching means provided between the output of said smoothing circuit and the external output terminal; and
   a third comparator means for comparing said charge voltage against a predetermined reference voltage;
   wherein said output switching means is activated in response to the output of said third comparator means.

* * * * *